(12) United States Patent
Ghosh

(10) Patent No.: US 6,219,379 B1
(45) Date of Patent: Apr. 17, 2001

(54) VSB RECEIVER WITH COMPLEX EQUALIZATION FOR IMPROVED MULTIPATH PERFORMANCE

(75) Inventor: Monisha Ghosh, New City, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/193,430

(22) Filed: Nov. 17, 1998

(51) Int. Cl.[7] .............................. H03H 7/30; H03H 7/40; H03K 5/159
(52) U.S. Cl. ............................ 375/232; 375/326
(58) Field of Search ...................... 375/229–236, 375/270, 277, 285, 321, 326, 346, 350, 365; 708/323, 322, 300, 819; 333/18, 28 R

(56) References Cited

U.S. PATENT DOCUMENTS

| | | | |
|---|---|---|---|
| 4,334,313 | * 6/1982 | Gitlin et al. . | |
| 5,642,382 | 6/1997 | Juan ....................... | 375/232 |
| 5,648,987 | * 7/1997 | Yang et al. ............ | 372/232 |
| 5,712,873 | 1/1998 | Shiue et al. ........... | 375/233 |
| 5,793,821 | * 6/1982 | Norrel et al. .......... | 375/355 |

FOREIGN PATENT DOCUMENTS

WO9526075  9/1995  (WO) .

OTHER PUBLICATIONS

ATSC 8–VSB Demodulator and Decoder, TDA 8960.
"Philips Semiconductors VSB Turner Front End and Channel Decoder Chipset for Digital TV.".
"ATSC Digital Television Standard", Doc. A/53, Sep. 1995.
"Self–Recovering Equalization and Carrier Tracking in Two–Dimensional Data Communication Systems", by D.N. Godard, IEEE Transactions on Communications, vol. 28, No. 11, Nov. 1980..
"A Method of Self–Recovering Equalization for Multilevel Amplitude–Modulation Systems", Y. Sato, IEEE Communications, Vo. Com–23, pp. 679–682, Jun. 1975.
"A Sign–Error Algorithm for Blind Equalization of Real Signals", Monisha Ghosh, ICASSP, May 1998.

* cited by examiner

*Primary Examiner*—Chi Pham
*Assistant Examiner*—Jean B. Corrielus
(74) *Attorney, Agent, or Firm*—Edward W. Goodman

(57) ABSTRACT

A method and device for improving the reception of a vestigial-sideband (VSB) signal by reducing the loss of information at the band edges in severe multipath. This is achieved by using complex equalization in conjunction with real equalization, in which any band-edge distortion is equalized by the complex equalization.

7 Claims, 4 Drawing Sheets

VSB RECEIVER WITH COMPLEX EQUALIZATION FOR IMPROVED MULTIPATH PERFORMANCE

BACKGROUND OF THE INVENTION

1. Field of the Invention

The subject invention relates to receiving digital signals, and more particularly, to a vestigial-sideband (VSB) receiver for operating in a less than ideal environment.

The digital terrestrial television transmission standard for the U.S. is a trellis coded 8-VSB system as described in detail in ATSC Digital Television Standard, Doc. A/53, http://www.atsc.org/stan&rps.html, September 1995. Briefly, three trellis-coded bits are encoded into one of eight symbols ±2, ±3, ±5, ±7. This real symbol stream, at 10.76 Msyms/s, has a double-sided spectrum in the digital frequency domain. One of the sidebands is filtered with a square-root-raised-cosine(SQRC) filter to give a vestigial-sideband (VSB) signal which is then up-converted to RF and transmitted.

2. Description of the Related Art

At the receiver, the conventional method of demodulation consists of first recovering the carrier frequency and phase, matched filtering, and then recreating the double-sideband real signal prior to equalization with a real equalizer operating at the symbol rate of 10.76 Msyms/s. In fact, one of the so-called "advantages" of a VSB system is the fact that, unlike quadrature amplitude modulation (QAM), complex equalization is not necessary.

However, the above receiver structure with a real equalizer is optimal only in the case of an ideal channel with perfect carrier and timing phase recovery. When the signal suffers multipath distortion, processing only the real part of the signal at the receiver causes information about the channel at the band edges to be lost. The situation is analogous to QAM where it has been shown that fractionally-spaced equalization can compensate for band-edge distortions in the channel that symbol-spaced equalization cannot. In VSB system, taking the real part of the signal causes aliasing of the band-edges in the same way that sampling a QAM signal at the symbol rate does.

SUMMARY OF THE INVENTION

Accordingly, it is an object of the invention to provide a receiver structure for a VSB system which reduces the loss of information at the band edges in severe multipath by using a blind complex equalizer in conjunction with a real equalizer. This object is achieved because the complex VSB signal at the symbol rate (i.e., 10.76 Msyms/s) is not aliased, and any band-edge distortions can be equalized with a complex equalizer.

It is another object of the invention to equalize the band edges of the complex baseband signal prior to recreating the double sideband signal.

It is yet a further object of the invention to simplify the complex equalizer by using a complex equalizer with a small number of taps to just equalize the band edges and then recover the field synchronization signal from the output of this complex equalizer for training a longer equalizer that equalizes the rest of the band.

It is even a further object of the invention to use a composite equalizer which has a feedback section having real taps and a forward section having an inner section with complex taps to compensate for the band edges, and an outer section with real taps.

The invention accordingly comprises the methods and features of construction, combination of elements, and arrangement of parts which will be exemplified in the construction hereinafter set forth, and the scope of the invention will be indicated in the claims.

BRIEF DESCRIPTION OF THE DRAWINGS

For a better understanding of the invention reference is made to the following drawings, in which.

DESCRIPTION OF THE PREFERRED EMBODIMENTS

Figure 1A:
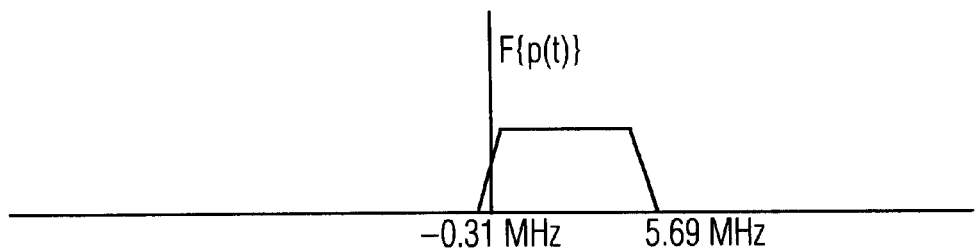
FIG. 1a shows the frequency spectrum of a SQRC filter, p(t)
Figure 1B:
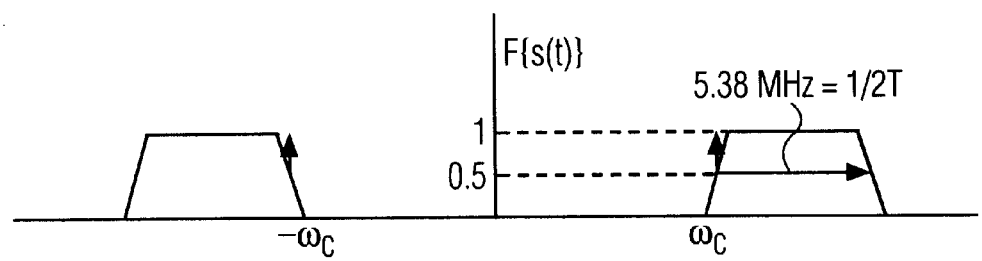
FIG. 1b shows the frequency spectrum of the transmitted signal, s(t)
Figure 1C:
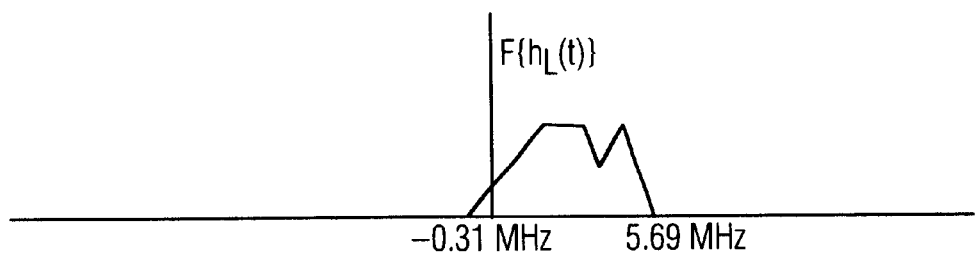
FIG. 1c shows the low-pass equivalent of the multipath channel.

FIGS. 1a–1d show the basic idea behind the invention. Let $a_n$ be the 8 level, real symbol stream with pilot tone at the symbol rate of 10.76 Msyms/s. This symbol stream has a double-sided spectrum of bandwidth 10.76 MHz. The VSB-transmitted signal at RF, s(t), is formed by first filtering this symbol stream to extract one side-band and a "vestige" of the other side-band, and then up-converting to the transmission frequency. The transmitted signal at RF, s(t), can then be written as:

$$s(t) = Re\left\{\sum_n a_n p(t-nT)e^{j\omega_c t}\right\} \quad (1)$$

where p(t) is the SQRC pulse shape with 11.5% roll-off as shown in FIG. 1a. Note that p(t) is a complex filter in the time domain and combines the operations of vestigial filtering and minimum intersymbol interference filtering when the same filter is used as a matched filter in the receiver. The spectrum of s(t) is shown in FIG. 1b. T is the symbol interval of 1/10.76 Msyms/s=92.94 ns, and $\omega_c$ is the carrier frequency. Let h(t) be the bandpass multipath channel that the RF signal s(t) encounters. This bandpass channel has a low-pass equivalent $h_L(t)$, shown in FIG. 1c, that is related to h(t) as follows:

$$h(t)=Re\{h_L(t)e^{j\omega_c t}\} \quad (2)$$

Figure 1D:
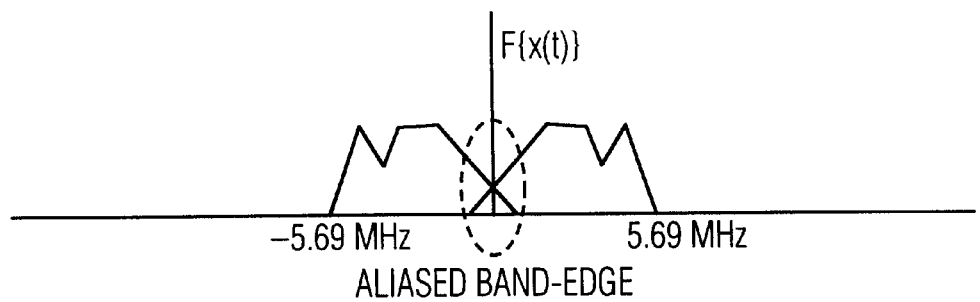
FIG. 1d shows the frequency spectrum of the recovered VSB signal showing aliasing of the band-edge.

The received signal r(t) at RF is the convolution of s(t) and h(t) and can be written as:

$$r(t) = Re\left\{\sum_n a_n d(t-nT)e^{j\omega_c t}\right\} \quad (3)$$

where $d(t)=p(t)*h_L(t)$, * denoting convolution. Conventional demodulation of r(t) involves down-conversion to baseband, either in the analog or digital domain, matched filtering and then recreating the original double-sided transmitted spectrum by taking the real part as shown in FIG. 1d. This baseband double-sideband signal x(t) can be written as:

$$x(t) = Re[\{r(t)e^{-j\omega_c t}\} \star p(t)] \quad (4)$$

$$= Re\left\{\sum_n a_n c(t-nT)e^{j\omega_c t}\right\} \quad (5)$$

where c(t)=p(t)*$h_L$(t)*p(t) i.e., c(t) is the composite baseband pulse-shape at the receiver. From FIG. 1d, it is clear that the process of taking the real part of the down-converted signal creates aliasing at the lower band-edge. Furthermore, sampling of x(t) at the symbol rate of 10.76 MHz will create aliasing of the other band-edge. This will lead to a performance loss in severe muultipath channels.

Instead, this invention proposes the general idea of equalizing the band edges of the complex baseband signal y(t) prior to recreating the double sideband signal. In the 8-VSB ATSC standard, equalization is usually carried out after the field synch segment that contains the training sequence is detected. However, if one wants to do complex equalization, it is preferable to use a blind algorithm since, in severe multipath channels, the signal may be too distorted for reliable synch extraction. Assuming perfect carrier recovery, y(t) can be written as:

$$y(t)=\{r(t)e^{-j\omega_c t}\} \star p(t) \quad (6)$$

Figure 2:
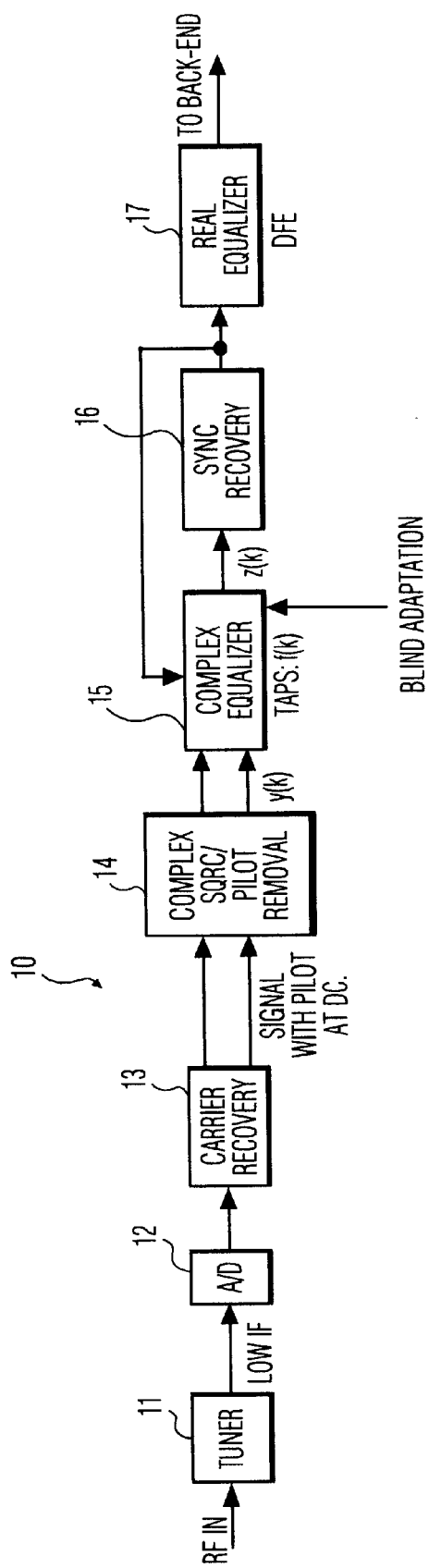
FIG. 2 shows a receiver in accordance with the invention.

Complex equalization of y(t) could be performed by sampling y(t) at the symbol rate of 10.76 MHz to form the complex sequence y(k), and then equalizing y(k) with a complex equalizer with coefficients f(k). Since the final goal is the transmitted, real, VSB symbol sequence, only the real part of the complex equalizer output is required for further processing. This reduces the number of multiplications required per tap from 4 to 2. This is still twice the number of multiplications required by a real equalizer. In general, f(k) could be chosen to equalize the entire band. However this would require a large number of taps, each with twice the number of multipliers than a real equalizer. There are 2 ways to simplify the equalizer. A first way is to place a complex equalizer by itself with a smaller number of taps to just equalize the band-edges and then recover the field synchronization signal from the output of this complex equalizer for training a longer, real equalizer that equalizes the rest of the band. The complex equalizer then needs to be adapted blindly, at least for the first data field, since the segment and field synchronization signals have not yet been recovered. This architecture is shown in FIG. 2. The recovery of segment synch after the complex equalizer makes synch recovery extremely robust even in severe multipath channels with band-edge distortions that can cause conventional synch detection on the real, aliased signal to fail. Referring to FIG. 2, the real output, z(k) of the complex equalizer with taps [f(0), . . . f($L_f$-1)] is related to the complex input y(k)=$y_R$(k)+$jy_I$(k) as follows:

$$z(k) = Re\left[\sum_{n=0}^{L_f-1}(fR(n)+jfI(n))(yR(k+d_1-n)+jyI(k+d_1-n))\right] \quad (7)$$

$$\sum_{n=0}^{L_f-1}[fR(n)yR(k+d_1-n)-fI(n)yI(k+d_1\ n)]$$

where $d_1$ is the delay through the complex equalizer. From the above, it is clear that for each tap, 2 multiplications are required, as opposed to 4 for a full complex multiplication as in QAM, and 1 for a real equalizer.

Figure 3:
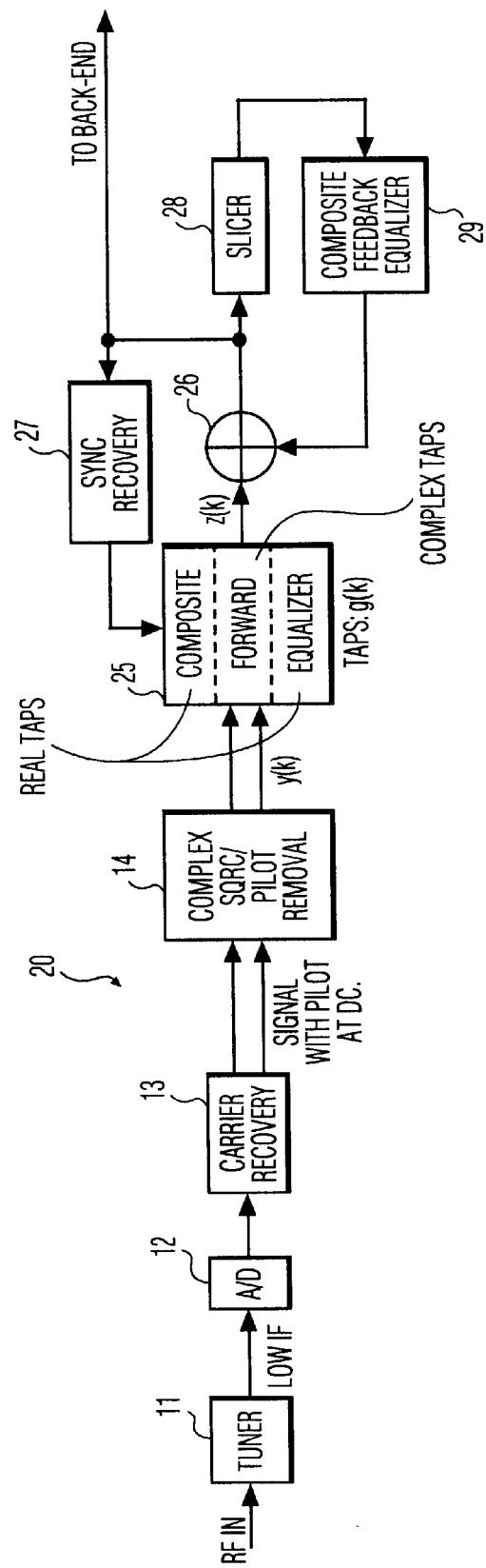
FIG. 3 shows a receiver in accordance with the invention which includes a forward equalizer with embedded real and complex taps.

The second way of accomplishing this, is to have a composite equalizer which has both a forward and feedback section as shown in FIG. 3. The feedback section has all real taps since the symbols are real. The forward section has an inner and outer section. The inner section has complex taps to compensate for the band-edges while the outer taps are real. Again, such an equalizer can start up in the blind mode and then switch to a trained mode of adaptation. The advantage of this structure is that the total number of multipliers required would be less than the previous approach. Let [g(0), . . . g($L_1$-1), g($L_1$), . . . g($L_1$+$L_2$-1), g($L_1$+$L_2$), . . . g($L_g$-1)] be the taps of the composite forward equalizer of length $L_g$. The first $L_1$ taps are real, the next $L_2$ taps are complex and the remaining taps again are real. The real output, z(k), of the composite forward equalizer is related to the complex input y(k)=$y_R$(k)+$jy_I$(k) and the taps of the composite equalizer g(k) as follows:

$$z(k) = \sum_{n=0}^{L_1-1}(g(n)yR(k+d_1-n))+ \quad (8)$$

$$Re\left[\sum_{n=L_1}^{L_1+L_2+1}(gR(n)+jgI(n))yR(k+d_1-n)+jyI(k+d_1-n))\right]+$$

$$\sum_{n=L_1+L_2}^{L_g-1}g(n)yR(k+d_1-n)$$

$$= \sum_{n=0}^{L_1-1}g(n)yR(k+d_1-n)+$$

$$\sum_{n=L_1}^{L_1+L_2+1}[gR(n)yR(k+d_1-n)-gI(n)yI(k+d_1-n)]+ \quad (9)$$

$$\sum_{n+L_1+L_2}^{L_g-1}g(n)yR(k+d_1-n)$$

Here, $d_1$ is the delay through the forward equalizer (i.e., center tap) and should be chosen such that ($L_1$-1)<$d_1$<($L_1$+$L_2$). The real output of the forward equalizer is then added to the real output of the feedback equalizer to form the final equalizer output.

The blind algorithm that could be used to adapt either of the above structures could be the Godard algorithm, D. N. Godard, "Self-recovering equalization and carrier tracking in two dimensional data communications systems," IEEE Trans. Commun., vol. COM-28, no. 11, pp. 1867–1975, November 1980, the Sato algorithm, Y. Sato, "A method of self recovering equalization for multilevel amplitude-modulation systems," IEEE Trans. Commun., vol. COM-23, pp. 679–682, June 1975, or the sign-error algorithm, M. Ghosh, "A sign-error algorithm for blind equalization of real signals,"ICASSP, May 1998. Of the three, the last one has the least complexity.

The general method and device to improve a receiver structure for VSB reception has been described above. The specific circuitry is now described. FIG. 2, as stated above, shows a short complex equalizer followed by a longer real equalizer 10. The up-converted VSB signal is provided at the input of tuner 11. It is then A/D converted in A/D converter 12. The carrier is recovered by the carrier recovery circuit 13, and the signal and pilot are complex square-root-raised cosine filtered and the pilot is removed in SQRC filter/pilot remover 14, and the signal is sampled at the symbol rate of 10.76 MHZ to form the complex sequence y(k). The complex equalizer 15 having taps f(k) equalizes the complex sequence y(k). In a preferred embodiment, only the band edges of y(k) are equalized, meaning f(k) is relatively a small number. The field synchronization signal is then recovered by the sync recovery unit 16 from the real output z(k) of the complex equalizer 15. The recovered sync signal is then used to further update the taps f(k) of the complex equalizer 15. The real equalizer 17 then equalizes the real output z(k).

In an alternate embodiment, shown in FIG. 3, a composite forward equalizer with embedded real and complex taps 20 is shown. As in the embodiment of FIG. 2, the up-converted VSB signal is provided at the input of tuner 11, it is A/D converted in A/D converter 12, the carrier is recovered in carrier recovery circuit 13. The signal and the pilot are complex-square-root-raised cosine filtered and the pilot is removed in SQRC filter/pilot remover 14, and the signal is sampled at the symbol rate of 10.76 MHz to form the complex sequence y(k). Now, in this embodiment, a composite equalizer if formed by a forward section 25 and a feedback section 29. The feedback section 29 contains all real taps since, after slicer 22, all symbols are real. The forward section 25 includes an inner section with complex taps to compensate for the band edges and an outer section with real taps to equalize the remainder of the VSB signal. The real output z(k) of the forward section 25 is summed in adder 26 with the real output of the feedback section 29. From this summed output, the sync signal is recovered by a sync recovery unit 27. This sync signal is used to train the taps of the forward section 25 once it is reliably detected.

Figure 4:
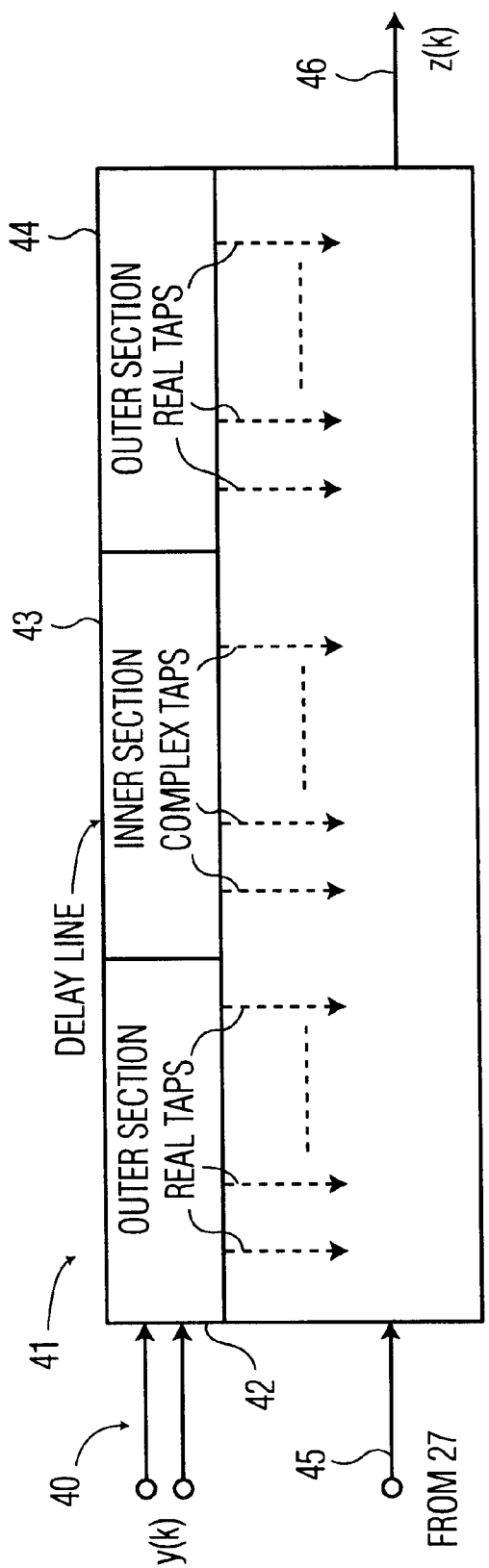
FIG. 4 shows a block diagram of the forward equalizer section of FIG. 3.

FIG. 4 shows a circuit block diagram of the forward section 25 of the composite equalizer, which is basically a finite impulse response (FIR) filter. The input 40 receives the complex signal y(k) and is connected to a delay line 41 having a first outer section 42, an inner section 43 and a second outer section 44. The first and second outer sections 42 and 44 have real taps, while the inner section 43 has complex taps. The output from the sync recovery unit 27 is applied to the control input 45 of the forward equalizer section 25 and, along with the signals on the real and complex taps of the delay line 41, form the output signal Z(k) on the output 46.

It will thus be seen that the objects set forth above, and those made apparent from the preceding description are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

What is claimed is:

1. A vestigial-sideband (VSB) receiver comprising:
   an input for receiving a VSB signal which includes a field synch segment and band edges;
   a complex equalizer for equalizing the band edges in the VSB signal;
   a synch recovery circuit coupled to an output of the complex equalizer for recovering the field sync segment; and
   a real equalizer for equalizing the remaining portion of the VSB signal.

2. The VSB receiver as claimed in claim 1, wherein the recovered field synch segment is used to train the complex equalizer.

3. The VSB receiver as claimed in claim 1 or 2, wherein said VSB receiver further comprises a blind adaptation circuit for blindly adapting the complex equalizer at least before the recovery of the field synch segment by the synch recovery circuit.

4. A vestigial-sideband (VSB) receiver comprising:
   an input for receiving a VSB signal including band edges;
   a composite equalizer comprising a forward section having an inner section with complex taps for equalizing band edges and an outer section with real taps for equalizing a remainder of the VSB signal, and a feedback section having real taps for equalizing a real output of the forward section.

5. A vestigial-sideband receiver comprising:
   an input for receiving an up-converted VSB signal;
   an A/D converter for A/D converting the up-converted VSB signal to a digital VSB signal;
   a square-root-cosine filter for filtering the digital VSB signal;
   a complex equalizer for equalizing band edges in the filtered digital VSB signal, said complex equalizer providing a real output;
   a sync recovery unit for recovery of a field synch segment from the real output of the complex equalizer; and
   a real equalizer for equalizing the real output of the complex equalizer.

6. A vestigial-sideband (VSB) receiver comprising:
   an input for receiving an up-converted VSB signal;
   an A/D converter for A/D converting the up-converted VSB signal to a digital VSB signal;
   a square-root-cosine filter for filtering the digital VSB signal;
   a composite forward equalizer having real and complex taps, the complex taps complex equalizing band edges of the filtered digital VSB signal, and the real taps equalizing a remaining portion of the filtered digital VSB signal, said composite forward equalizer having a real output;
   a slicer for estimating the real output of the composite forward equalizer to the nearest symbol;
   a feedback equalizer for equalizing an output of the slicer and for providing an equalized output;
   an adder for adding the equalized output of the feedback equalizer and the real output of the composite forward equalizer forming a finalized equalizer output; and
   a sync recovery unit for recovering a field sync segment from the finalized equalized output, an output of the sync recovery unit being used for adapting the taps of the composite forward equalizer.

7. A method of equalizing a vestigial-sideband (VSB) signal comprising the steps:
   receiving the VSB signal which includes a field sync segment and band edges;
   complex equalizing the band edges to provide a real output;
   recovering the field sync segment from the real output;
   real equalizing the real output; and
   adapting the step of complex equalizing using the recovered field synch segment.

* * * * *